(12) United States Patent
Li

(10) Patent No.: US 6,661,943 B2
(45) Date of Patent: Dec. 9, 2003

(54) FIBER-FREE OPTICAL INTERCONNECT SYSTEM FOR CHIP-TO-CHIP SIGNALING

(75) Inventor: Yuan-Liang Li, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 10/062,795

(22) Filed: Jan. 30, 2002

(65) Prior Publication Data

US 2003/0142913 A1 Jul. 31, 2003

(51) Int. Cl.[7] ................................................. G02B 6/42
(52) U.S. Cl. ............................ 385/18; 385/14; 359/15
(58) Field of Search ........................... 385/14, 16, 17, 385/18, 19, 24; 359/15

(56) References Cited

U.S. PATENT DOCUMENTS

| | | | | |
|---|---|---|---|---|
| 5,159,700 A | * | 10/1992 | Reid et al. | 385/14 |
| 5,237,434 A | * | 8/1993 | Feldman et al. | 385/14 |
| 5,416,861 A | * | 5/1995 | Koh et al. | 385/14 |
| 5,502,785 A | | 3/1996 | Wang et al. | |
| 5,513,021 A | * | 4/1996 | Kaneshiro et al. | 385/14 |
| 5,638,469 A | * | 6/1997 | Feldman et al. | 385/14 |
| 5,761,350 A | * | 6/1998 | Koh | 385/14 |
| 5,818,984 A | * | 10/1998 | Ahmad et al. | 385/14 |
| 5,832,147 A | | 11/1998 | Yeh et al. | |
| 5,923,796 A | * | 7/1999 | Feldman et al. | 385/14 |
| 6,049,639 A | * | 4/2000 | Paniccia et al. | 385/14 |
| 6,097,857 A | | 8/2000 | Feldman | |
| 6,421,473 B1 | * | 7/2002 | Paniccia et al. | 385/14 |
| 6,430,331 B1 | * | 8/2002 | Hagelin et al. | 385/17 |
| 6,531,767 B2 | * | 3/2003 | Shrauger | 385/14 |

* cited by examiner

Primary Examiner—Michael P. Stafira
Assistant Examiner—Juan D Valentin, II
(74) Attorney, Agent, or Firm—Blakely, Sokoloff, Taylor & Zafman LLP

(57) ABSTRACT

Embodiments of an apparatus and method for optical chip-to-chip signaling via free-space are disclosed herein. In one representative embodiment of a fiber-free interconnect system in accordance with the teachings of the present invention, a plurality of microchips packages, each including a microchip coupled to a carrier, may be mounted to a surface of a substrate. Each of the plurality of microchip packages may also include at least one optoelectronic microchip coupled to the carrier, and including an optical source and/or an optical detector to generate or detect optical signals, respectively, to facilitate communication between microchips. Each of the plurality of microchip packages may be mounted to the substrate to optically couple the at least one optoelectronic microchip to a corresponding micro-electro mechanical system mirror array to reflect the optical signals to the optical detector, or from the optical source, respectively.

19 Claims, 6 Drawing Sheets

US 6,661,943 B2

FIBER-FREE OPTICAL INTERCONNECT SYSTEM FOR CHIP-TO-CHIP SIGNALING

TECHNICAL FIELD OF THE INVENTION

This disclosure relates generally to signaling using optical interconnects, and more particularly, but not exclusively, to a fiber-free optical interconnect system for chip-to-chip signaling utilizing free-space optical communications between transmitter and receiver components associated with integrated circuit chips.

BACKGROUND INFORMATION

State of the art microelectronic systems commonly employ multichip modules. A multichip module includes an array of integrated circuit chips that require signal interconnections between the chips. Multichip modules having only electrical interconnections between chips have only limited performance, and are not suitable for many next-generation computational systems, for example. As such, optical interconnections have been developed with the potential to increase communication speed, and reduce the volume, crosstalk, and power dissipation associated with electrical interconnections.

Numerous methods have been described for utilizing optical beams for interconnection of integrated circuit chips. In one system, optoelectronic transmitters and receivers are coupled to planar optical waveguides. The planar optical waveguides use holographic optical elements ("HOEs") or other coupling gratings to direct optical emissions from the optoelectronic transmitters into the planar optical waveguide. This implementation, while effective, has the disadvantage of being costly, not only in terms of materials and fabrication, but in terms of space occupied by the optical waveguides on a motherboard or other substrate in which the optical waveguides or optical fibers are embedded, for example.

Other methods for utilizing optical beams for interconnection of integrated circuit chips employ HOEs mounted to an optically transparent substrate positioned parallel and adjacent to a circuit board, or other chip carrier, to refract and/or reflect optical signals between chips. One disadvantage of this type of interconnection method is the requirement for the optically transparent substrate, which may contribute to increased complexity of design or packaging requirements in order to facilitate optical communication between chips.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION

Embodiments of a fiber-free optical interconnect system for chip-to-chip signaling are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide an apparatus and method for chip-to-chip signaling via free-space. In one representative embodiment in accordance with the teachings of the present invention, a plurality of microchip packages, each including a microchip electrically coupled to a surface of a carrier, may be mounted to a surface of a substrate (e.g., a motherboard, circuit board, or the like). Each of the plurality of microchip packages may also include an optoelectronic microchip electrically coupled to the surface of the carrier. The optoelectronic microchip may include an optical source and/or an optical detector for generating or detecting optical signals, respectively. In one embodiment, each of the plurality of microchip packages may be mounted to the surface of the substrate in a manner to optically couple the optoelectronic microchip to a micro-electro mechanical system ("MEMS") mirror array. The MEMS mirror array may then reflect the optical signals to the optical detector, or from the optical source, to enable communication between the microchips of two or more different microchip packages.

In other embodiments in accordance with the teachings of the present invention, a plurality of optoelectronic microchips may be electrically coupled to the surface of the carrier of each microchip package to enable simultaneous communication with a plurality of other microchips. Other features of the illustrated embodiments will be apparent to the reader from the foregoing and the appended claims, and as the detailed description and discussion is read in conjunction with the accompanying drawings.

Figure 1:
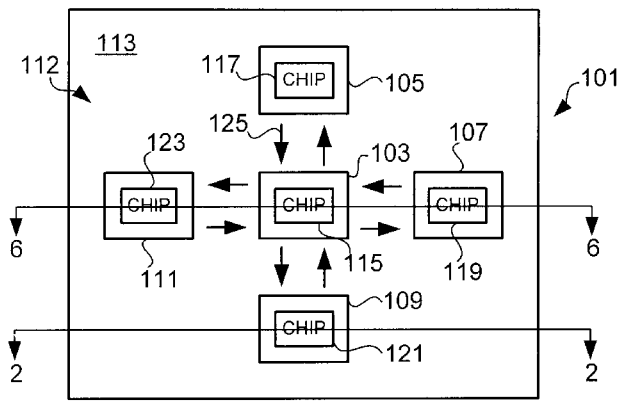
FIG. 1 is a schematic top plan view of an embodiment of a multichip module in accordance with the teachings of the present invention.

With reference now to the drawings, and in particular to FIG. 1, an embodiment of a multichip module 101 is illustrated in accordance with the teachings of the present invention. The multichip module 101 includes a plurality of microchip packages 103, 105, 107, 109, and 111 mounted to a surface 112 of a substrate 113, which may be a motherboard or other circuit board, or the like. Each of the plurality of microchip packages 103–111 includes, in an embodiment, a microchip 115, 117, 119, 121, and 123, respectively, which may be formed by processes well known to those skilled in the art. In the illustrated embodiment, each microchip 115–123 is capable to communicate with at least one other microchip 115–123 via free-space optical signals 125 transmitted between components of the microchip packages 103–111, as will be discussed in greater detail hereinafter.

Figure 2A:
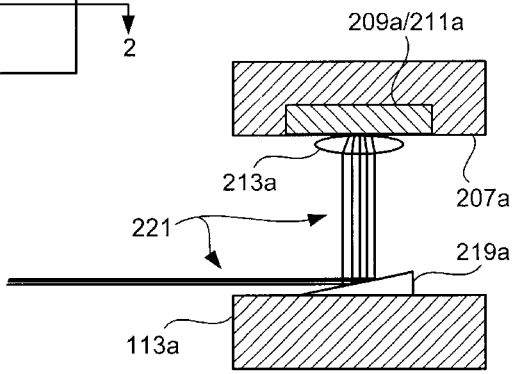
FIG. 2A is an enlarged view representative of a portion of FIG. 2 illustrating how an optical signal may be reflected to and/or from an optical element in accordance with the teachings of the present invention.
Figure 2:
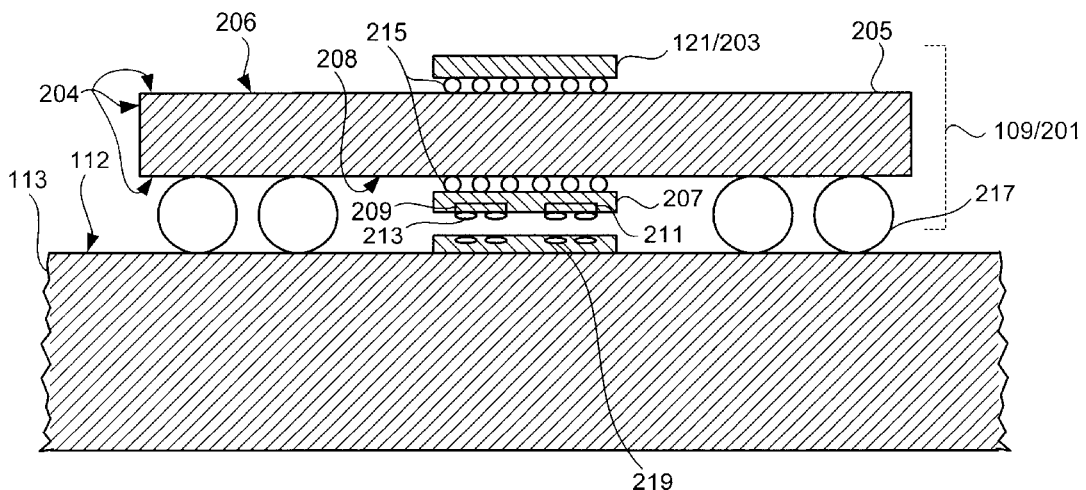
FIG. 2 is schematic cross-sectional view of an embodiment of a microchip package mounted to a substrate taken substantially along line 2—2 of FIG. 1 in accordance with the teachings of the present invention.

With reference now primarily to FIG. 2, a schematic cross-sectional view of an embodiment of a microchip package 201 (e.g., the microchip package 109, FIG. 1) mounted to a substrate 113, taken substantially along line 2—2 of FIG. 1, is shown in accordance with the teachings of the present invention. The microchip package 201 may be representative of any one or more of the microchip packages 103–111 illustrated in FIG. 1, and discussed above. In the embodiment illustrated in FIG. 2, the microchip package 201 includes a microchip 203 (e.g., the microchip 121, FIG. 1) electrically coupled to a surface 204 of a carrier 205 via a plurality of small solder balls 215. In one embodiment, the microchip 203 may be coupled to the surface 204 of the carrier 205 via a controlled collapsible chip connection ("C4") process. The C4 process is well known to those skilled in the art and will not be discussed in greater detail herein.

In one embodiment, the microchip package 201 also includes an optoelectronic microchip 207 electrically coupled to the surface 204 of the carrier 205. The optoelectronic microchip 207 may also be coupled to the surface 204 of the carrier 205 via the C4 process, in an embodiment. Reference herein to the surface 204 of the carrier 205 is intended to refer to the entire exterior surface of the carrier 205, as indicated by reference numeral 204 in FIG. 2. In the illustrated embodiment, the microchip 203 and the optoelectronic microchip 207 are coupled to opposing sides 206 and 208, respectively, of the surface 204 of the carrier 205. It will be appreciated that in another embodiment, the microchip 203 and the optoelectronic microchip 207 may be coupled to a common side of the surface 204 of the carrier 205.

The optoelectronic microchip 207 may include, in an embodiment, one or more optical elements, such as an optical source 209 and/or an optical detector 211. In one embodiment, the optical source 209 may comprise a vertical cavity surface emitting laser ("VCSEL") array, other laser device, or the like, while the optical detector may comprise a photodetector array, or the like. In another embodiment, at least one additional optoelectronic microchip (see, e.g., FIGS. 3A, 4A, and 5A) may also be electrically coupled to the surface 204 of the carrier 205 to enable the microchip 203 to communicate with multiple other microchips simultaneously.

It will be appreciated that in another embodiment in accordance with the teachings of the present invention, separate optoelectronic microchips (e.g., the optoelectronic microchip 207), including only an optical source (e.g., the optical source 209) or an optical detector (e.g., the optical detector 211), respectively, may be electrically coupled to the surface 204 of the carrier 205 to transmit or receive optical signals. In one embodiment, the optical source 209 and/or the optical detector 211 include(s) a micro-lens array 213 configured to focus an incident optical signal from the optical source 209, or to the optical detector 211.

In the embodiment illustrated in FIG. 2, the microchip package 201 is mounted to a surface 112 of the substrate 113 via a plurality of ball-grid-array ("BGA") balls 217. The BGA balls 217 may be formed in any one of a number of different patterns to accommodate various configurations of optoelectronic microchips (e.g., the optoelectronic microchip 207) electrically coupled to the surface 204 of the carrier 205, as will be discussed in greater detail hereinafter with reference to FIGS. 3A–5B. The BGA balls 217 provide, in an embodiment, a power and ground connection between the substrate 113 and the carrier 205 to power the micrchip 203 and the optoelectronic microchip 207.

The substrate 113, as mentioned above, may comprise a motherboard, printed circuit board ("PCB"), or the like, in an embodiment, and may include a MEMS mirror array 219 optically coupled to the optoelectronic microchip 207. The MEMS mirror array 219 may be positioned, in an embodiment, to reflect optical signals to and/or from the optical element(s) (e.g., the optical source 209 and/or the optical detector 211) of the optoelectronic microchip 207 to enable communication between pairs of optoelectronic microchips (e.g., the optoelectronic microchip 207), corresponding to distinct microchip packages. Communication between pairs of optoelectronic microchips (e.g., the optoelectronic microchip 207) may be via free-space in accordance with the teachings of the present invention. It will be appreciated that in one embodiment, the substrate 113 may include at least one additional MEMS mirror array (e.g., the MEMS mirror array 219) optically coupled to each additional optoelectronic mircochip (e.g., the optoelectronic microchip 207) coupled to the surface 204 of the carrier 205.

FIG. 2A is an enlarged view representative of a portion of the embodiments shown in FIG. 2, and illustrates how an optical signal may be reflected to and/or from an optical element in accordance with the teachings of the present invention. In the enlarged view, a portion of an optoelectronic microchip 207a is shown with an optical element 209a/211a, which may comprise the optical source 209 (see, e.g., FIG. 2) or the optical detector 211 (see, e.g., FIG. 2). A portion of a substrate 113a, representative of the substrate 113 illustrated in FIGS. 1 and 2, includes a MEMS mirror 219a optically coupled to the optoelectronic microchip 207a to reflect an optical signal 221 to and/or from the optical element 209a/211a, in an embodiment. A micro-lens 213a, positioned adjacent to the optical element 209a/211a focuses the optical signal 221 from the optical source (i.e., the optical element 209a), or to the optical detector (i.e., the optical element 211a), in an embodiment.

Figure 3A:
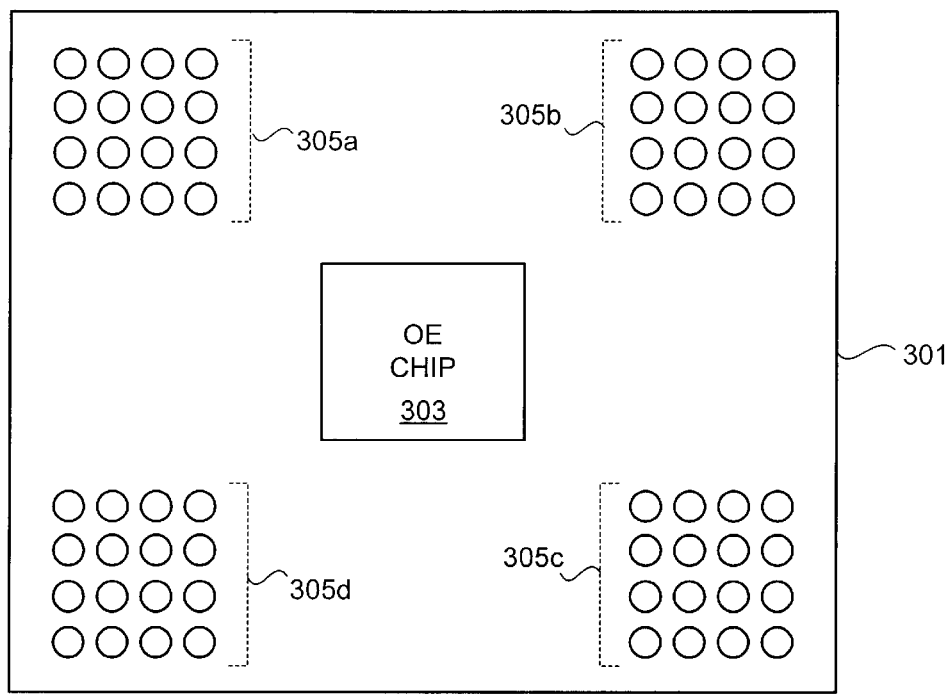
FIG. 3A is a schematic bottom plan view of an embodiment of a microchip package in accordance with the teachings of the present invention.
Figure 3B:
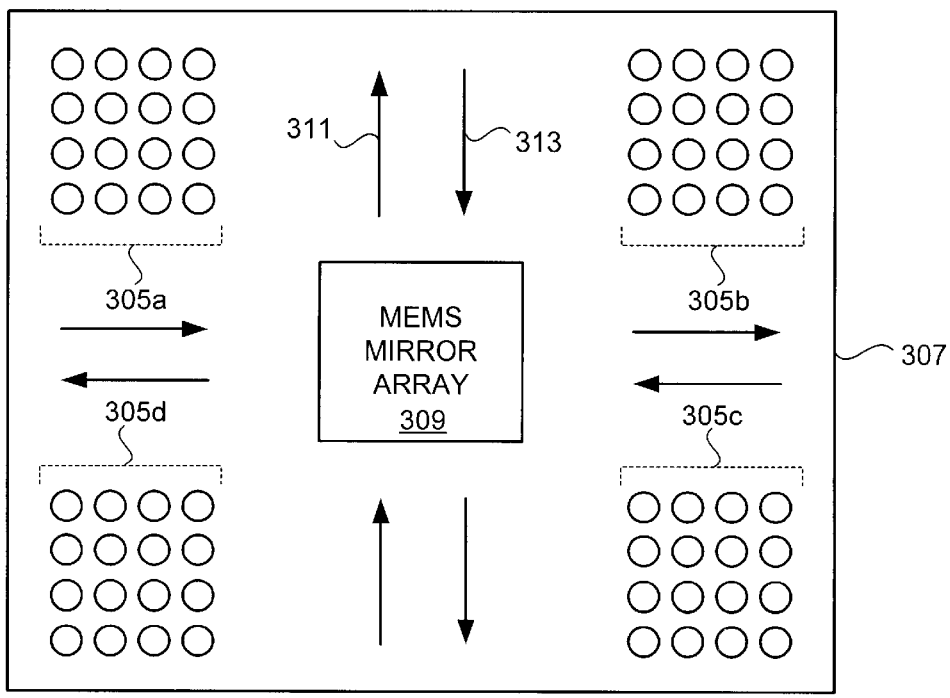
FIG. 3B is a schematic top plan view of an embodiment of a portion of a substrate to which the microchip package of FIG. 3A may be coupled in accordance with the teachings of the present invention.

With reference now primarily to FIGS. 3A and 3B, a schematic bottom plan view of an embodiment of a microchip package, and a schematic top plan view of an embodiment of a portion of a substrate to which the microchip package may be coupled, are shown, respectively, in accordance with the teachings of the present invention.

With reference first to FIG. 3A, the illustrated microchip package includes a carrier 301 (e.g., the carrier 205, FIG. 2) having an optoelectronic microchip 303 electrically coupled to a surface thereof, as discussed above in conjunction with FIG. 2. In the embodiment illustrated in FIG. 3A, the optoelectronic microchip 303 is coupled to the surface of the carrier 301 substantially in a central orientation. The optoelectronic microchip 303 may be positioned adjacent to four ball-grid-arrays 305a–d, located substantially at the corners of the carrier 301 as illustrated in FIG. 3A, when the microchip package is mounted to a surface of the portion of the substrate 307 (see, e.g., FIG. 3B).

The substrate 307, illustrated in FIG. 3B, may include a MEMS mirror array 309 in a position such that the MEMS mirror array 309 may be optically coupled to the optoelectronic microchip 303 when the microchip package of FIG. 3A is mounted to the surface of the substrate 307 in a manner similar to that illustrated in FIG. 2, and discussed above. The optoelectronic microchip 303 may then transmit an optical signal (e.g., the optical signal 311), via an optical source (e.g., the optical source 209, FIG. 2), toward the MEMS mirror array 309, or receive an optical signal (e.g., the optical signal 313), via an optical detector (e.g., the optical detector 211, FIG. 2), reflected from the MEMS mirror array 309, as described above in conjunction with FIG. 2A.

The ball-grid-arrays 305a–d are illustrated in both FIGS. 3A and 3B to show their location in regard to the optoelectronic microchip 303 and the MEMS mirror array 309. However, it will be appreciated that only a single layer of BGA balls will actually comprise each ball-grid-array 305a–d, in an embodiment. The position of the optoelectronic microchip 303, the MEMS mirror array 309, and the four ball-grid-arrays 305a–d, produce four channels through which free-space optical signals (e.g., the optical signals 311 and 313) may be transmitted to enable communication between the optoelectronic microchip 303 and one or more other optoelectronic microchips (not shown) mounted to another portion of the substrate 307, as illustrated in FIG. 1. It will be appreciated that the MEMS mirror array 309 may be configured to tilt around the axes within the plane of the substrate to reflect optical signals through or from any one of the four channels, as needed.

Figure 4A:
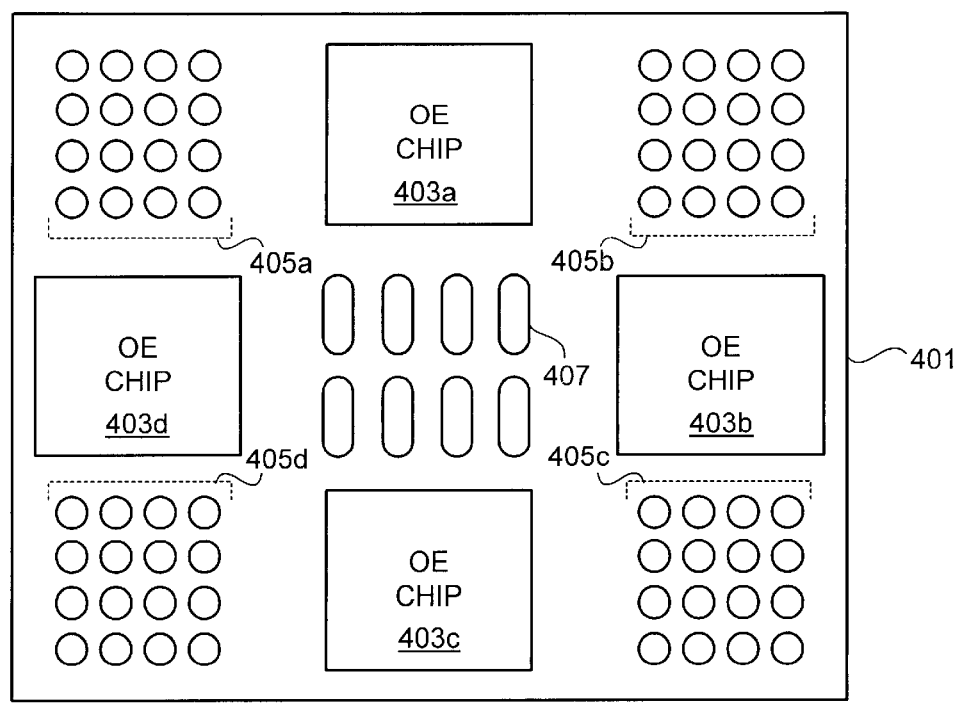
FIG. 4A is a schematic bottom plan view of another embodiment of a microchip package in accordance with the teachings of the present invention.
Figure 4B:
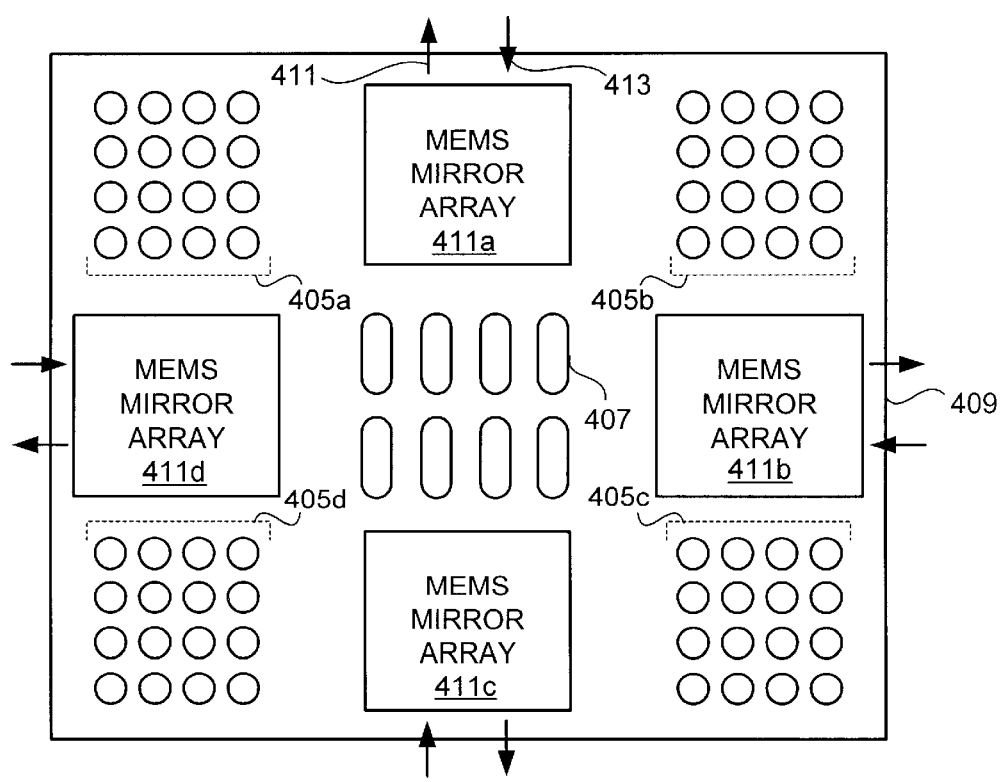
FIG. 4B is a schematic top plan view of another embodiment of a portion of a substrate to which the microchip package of FIG. 4A may be coupled in accordance with the teachings of the present invention.

With reference now primarily to FIGS. 4A and 4B, a schematic bottom plan view of another embodiment of a microchip package, and a schematic top plan view of another embodiment of a portion of a substrate to which the microchip package may be coupled, are shown, respectively, in accordance with the teachings of the present invention.

With reference first to FIG. 4A, the illustrated microchip package includes a carrier 401 (e.g., the carrier 205, FIG. 2) having a plurality of optoelectronic microchips 403a–d electrically coupled to a surface thereof, as discussed above in conjunction with FIG. 2. In the embodiment illustrated in FIG. 4A, each of the plurality of optoelectronic microchips 403a–d is coupled to the surface of the carrier 401 along an edge of the carrier 401 in a substantially central position.

Each of the plurality of optoelectronic microchips 403a–d may be flanked by a corresponding pair of the four ball-grid-arrays 405a–d positioned substantially at the corners of the carrier 401 when the carrier 401 is mounted to a surface of the portion of the substrate 409 (see, e.g., FIG. 4B). In one embodiment, an array of land side capacitors ("LSCs") 407 for power decoupling may be provided to enable a high power application, such as a central processing unit microchip that requires fewer input/output interfaces (e.g., the optoelectronic microchips 403a–d) for communication with other microchips and/or memory devices, or the like.

The substrate 409, illustrated in FIG. 4B, may include a plurality of MEMS mirror arrays 411a–d positioned such that each one of the plurality of MEMS mirror arrays 411a–d may be optically coupled to one of the plurality of optoelectronic microchips 403a–d when the microchip package of FIG. 4A is mounted to the surface of the substrate 409 in a manner similar to that illustrated in FIG. 2, and discussed above. This arrangement enables each one of the plurality of optoelectronic microchips 403a–d to transmit an optical signal (e.g., the optical signal 411), via an optical source (e.g., the optical source 209, FIG. 2), toward the corresponding MEMS mirror array 411a–d, or receive an optical signal (e.g., the optical signal 413), via an optical detector (e.g., the optical detector 211, FIG. 2), reflected from the corresponding MEMS mirror array 411a–d.

As discussed above in conjunction with FIGS. 3A and 3B, the ball-grid-arrays 405a–d are illustrated in both FIGS. 4A and 4B to show their location in regard to the optoelectronic microchips 403a–d and the MEMS mirror arrays 411a–d. However, it will be appreciated that only a single layer of BGA balls will actually comprise each ball-grid-array 405a–d, in an embodiment.

Figure 5A:
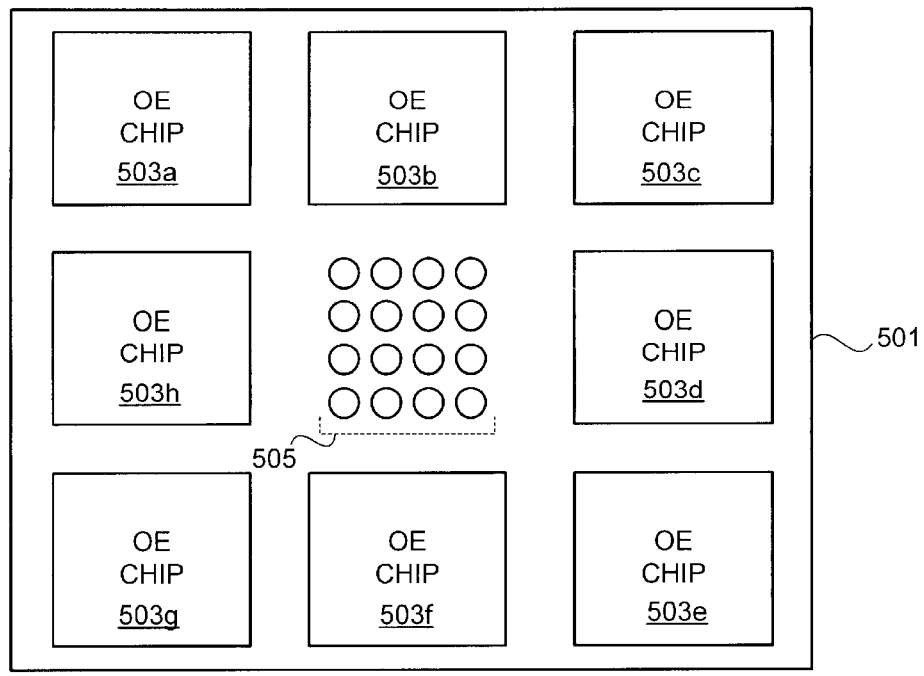
FIG. 5A is a schematic bottom plan view of yet another embodiment of a microchip package in accordance with the teachings of the present invention.
Figure 5B:
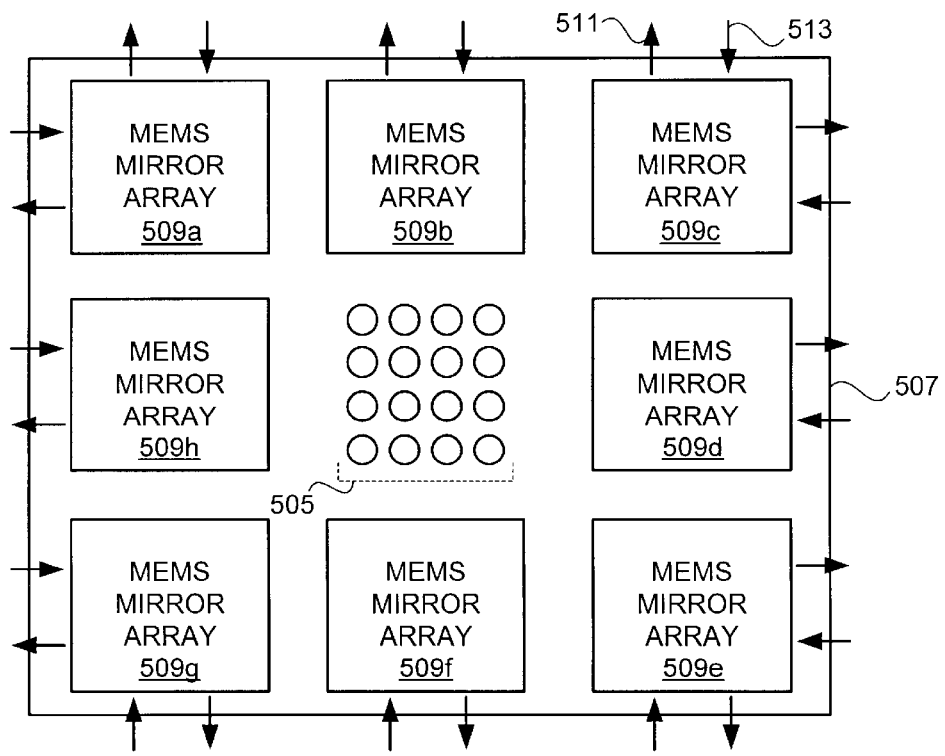
FIG. 5B is a schematic top plan view of yet another embodiment of a portion of a substrate to which the microchip package of FIG. 5A may be coupled in accordance with the teachings of the present invention.

With reference now primarily to FIGS. 5A and 5B, a schematic bottom plan view of yet another embodiment of a microchip package, and a schematic top plan view of yet another embodiment of a portion of a substrate to which the microchip package may be coupled, are shown, respectively, in accordance with the teachings of the present invention.

With reference first to FIG. 5A, the illustrated microchip package includes a carrier 501 (e.g., the carrier 205, FIG. 2) having a plurality of optoelectronic microchips 503a–h electrically coupled to a surface thereof, as discussed above in conjunction with FIG. 2. In the embodiment illustrated in FIG. 5A, the plurality of optoelectronic microchips 503a–h are coupled to the surface of the carrier 501 around the perimeter thereof to maximize the number of input/output interfaces (e.g., the optoelectronic microchips 503a–h) associated with a microchip (not shown) electrically coupled to the surface of the carrier 501 (in the embodiment illustrated in FIG. 5A, the microchip may be electrically coupled to the surface of the carrier 501 on a side opposing the side to which the plurality of optoelectronic microchips 503a–h are coupled). In one instance, the arrangement of components illustrated in the embodiments shown in FIGS. 5A and 5B may be utilized for a low-power application in which the microchip (not shown) must communicate with a relatively large number of other microchips (not shown), memory devices, or the like.

In the embodiment illustrated in FIG. 5A, the plurality of optoelectronic microchips 503a–d surround a ball-grid array 505 that provides an electrical connection to the substrate 507 (see, e.g., FIG. 5B) when the carrier 501 is mounted to a surface of the substrate 507, as discussed above in conjunction with FIG. 2. The substrate 507, illustrated in FIG. 5B, may include a plurality of MEMS mirror arrays 509a–h positioned such that each one of the plurality of MEMS mirror arrays 509a–h may be optically coupled to one of the plurality of optoelectronic microchips 503a–h when the microchip package of FIG. 5A is mounted to the surface of the substrate 507 in a manner similar to that illustrated in FIG. 2, and discussed above. This arrangement enables each one of the plurality of optoelectronic microchips 503a–h to transmit an optical signal (e.g., the optical signal 511), via an optical source (e.g., the optical source 209, FIG. 2), toward the corresponding MEMS mirror array 509a–h, or receive an optical signal (e.g., the optical signal 513), via an optical detector (e.g., the optical detector 211, FIG. 2), reflected from the corresponding MEMS mirror array.

As discussed above in conjunction with FIGS. 3A–3B, and 4A–4B, the ball-grid-array 505 is illustrated in both FIGS. 5A and 5B to show the location of the ball-grid-array 505 in regard to the optoelectronic microchips 503a–h and the MEMS mirror arrays 509a–h, but that only a single layer of BGA balls will actually comprise the ball-grid-array 505, in an embodiment.

It will be appreciated that other arrangements of optoelectronic microchips and corresponding MEMS mirror arrays may be included in other embodiments of the fiber-free optical interconnect system in accordance with the teachings of the present invention.

Figure 6:
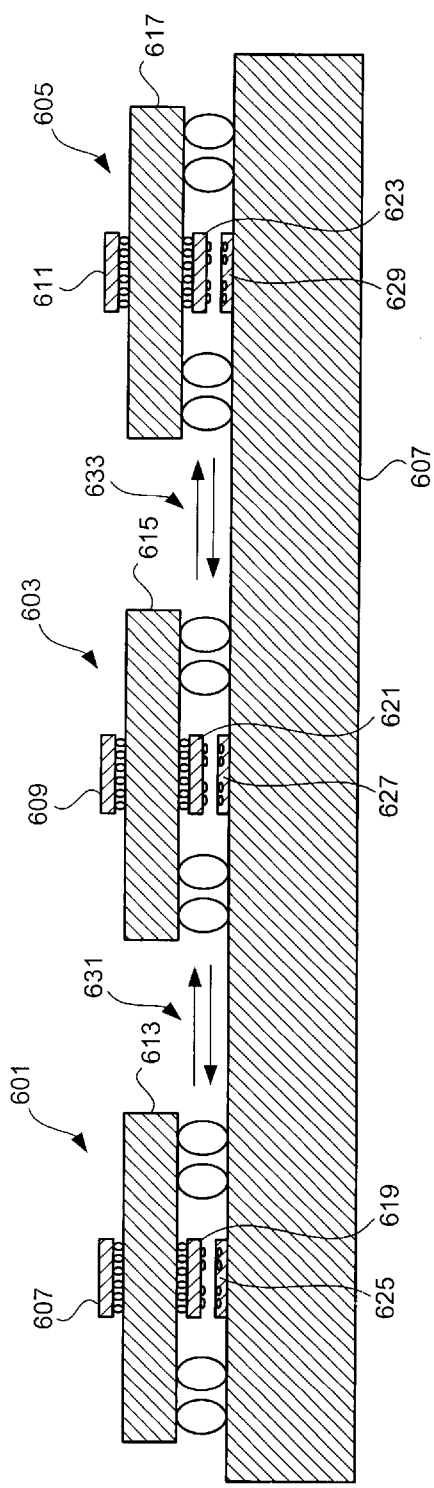
FIG. 6 is a schematic cross-sectional view of an embodiment of an array of microchip packages mounted to a substrate taken substantially along line 6—6 of FIG. 1 in accordance with the teachings of the present invention.

With reference now primarily to FIG. 6, a schematic cross-sectional view of an embodiment of an array of microchip packages mounted to a substrate, taken substantially along line 6—6 of FIG. 1, is shown in accordance with the teachings of the present invention. A first microchip package 601, a second microchip package 603, and a third microchip package 605 each includes a microchip 607, 609, and 611, respectively, electrically coupled to a surface of a carrier 613, 615, and 617, respectively. In addition, each microchip package 601–605 includes an optoelectronic microchip 619, 621, and 623, respectively, electrically coupled to the surface of the corresponding carrier 613–617 respectively. As described above in conjunction with FIG. 2, each of the optoelectronic microchips 619–623 may include an optical source and/or an optical detector to enable communication between two or more optoelectronic microchips 619–623 via free-space optical signals.

In the embodiment illustrated in FIG. 6, the substrate 607 to which the array of microchip packages 601–605 are mounted, includes a plurality of MEMS mirror arrays 625, 627, and 629, each of the MEMS mirror arrays 625–629 optically coupled to one of the optoelectronic microchips 619–623 to reflect optical signals (e.g., optical signals 631 and 633) to and/or from the corresponding optoelectronic microchip 619–623. In one embodiment, no additional mechanism for communication (e.g., electrical chip-to-chip interconnections) exists between the array of microchip packages.

Figure 7:
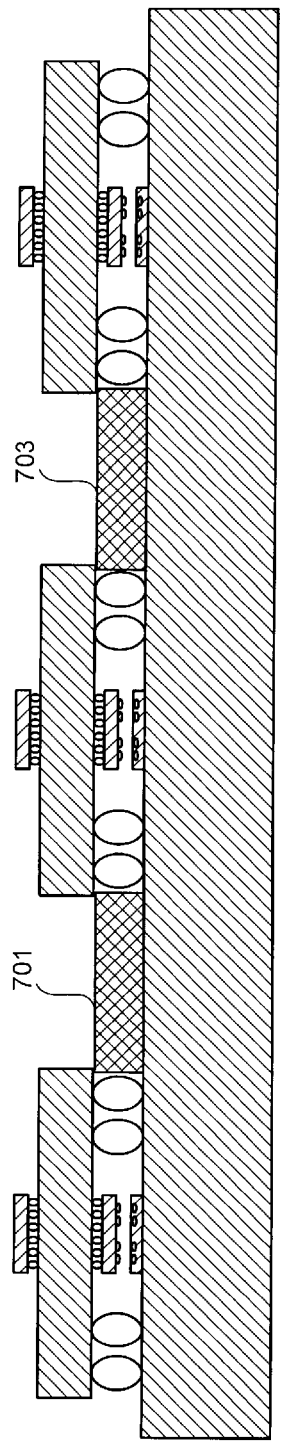
FIG. 7 is a schematic cross-sectional view of another embodiment of an array of microchip packages, like FIG. 6, showing a communication system including communication ducts in accordance with the teachings of the present invention.

FIG. 7 is a schematic cross-sectional view of another embodiment of an array of microchip packages, like those shown in FIG. 6, including communication ducts 701 and 703 between microchip packages to facilitate communication between microchip packages in accordance with the teachings of the present invention. In some circumstances, optical signals transmitted via free-space between microchip packages may be impacted by dust or air turbulence created by a heat sink fan or the like. In this environment, the incorporation of communication ducts (e.g., the communication ducts 701, 703), such as those illustrated in FIG. 7, may aid in the transmission of optical signals between optoelectronic microchips of different microchip packages by preventing or reducing interferences caused by dust or air turbulance. In one embodiment, the communication ducts 701 and 703 may be constructed from a plastic material to reduce the potential for electromagnetic interference with the signals.

Figure 8:
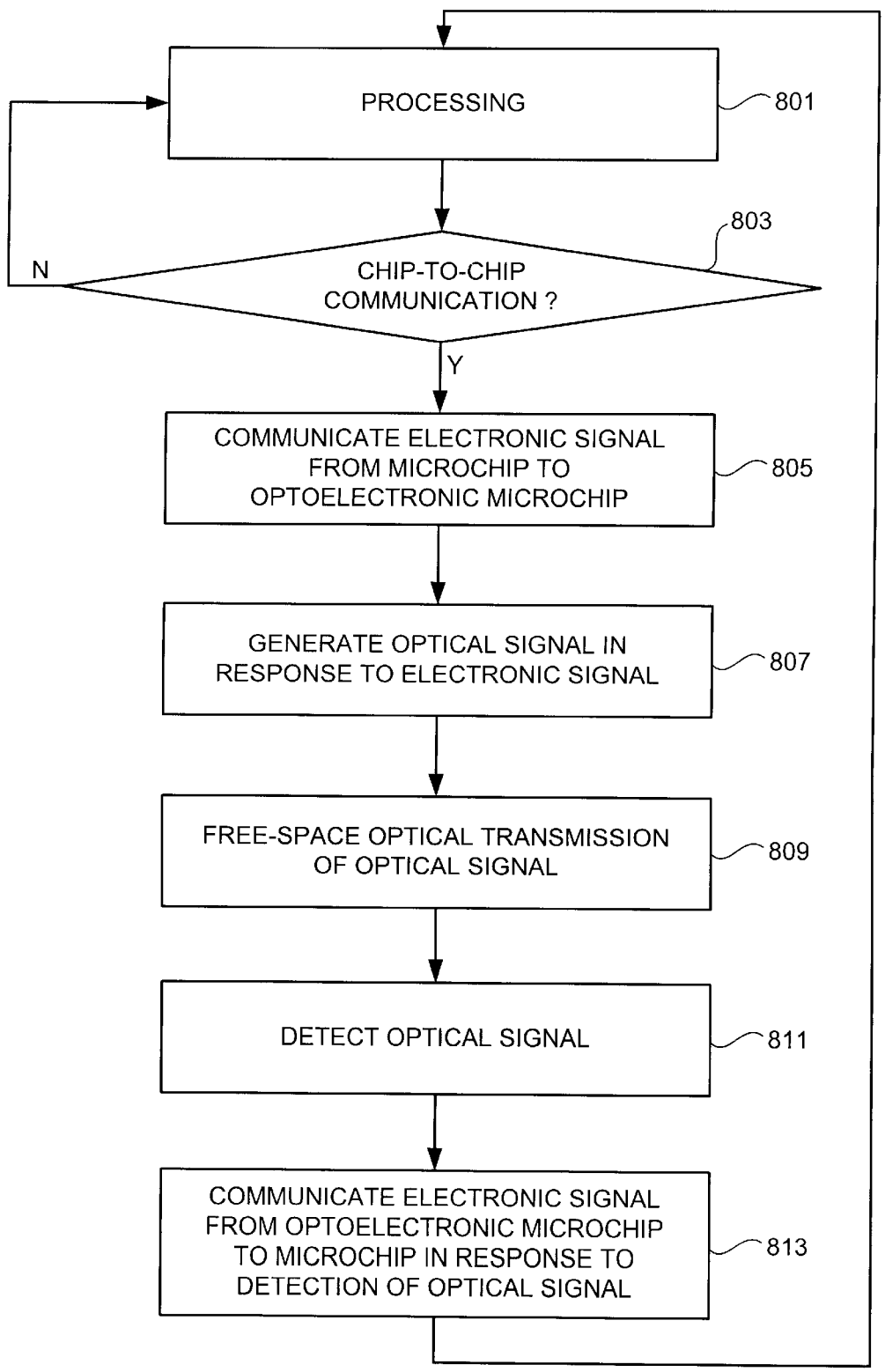
FIG. 8 is a flow diagram illustrating an embodiment of a flow of events in accordance with the teachings of the present invention.

With reference now primarily to FIG. 8, a flow diagram illustrating an embodiment of a flow of events is shown in accordance with the teachings of the present invention. For purposes of illustration, assume that a first microchip (e.g., the microchip 203, FIG. 2) may be processing a set of machine-readable instructions to perform a function (see, e.g., process block 801) within a multichip environment. If, at some point during the processing operation or at the completion of the processing operation, the first microchip requires communication with a second microchip (see, e.g., process block 803), the first microchip may communicate a first electronic signal to a corresponding first optoelectronic microchip (see, e.g., process block 805). It will be appreciated that if no chip-to-chip communication is required (see, e.g., block 803), then the processing operation will continue, as necessary, within the first microchip, in an embodiment.

Continuing with the foregoing example, the first optoelectronic microchip may then generate a first optical signal, via a first optical source, in response to the first electronic signal (see, e.g., process block 807). As discussed above, the first optical signal may then be reflected from an adjacent first MEMS mirror array, and travel through free-space (see, e.g., process block 809) toward a second MEMS mirror array, which is adjacent to a second optoelectronic microchip. The first optical signal may then be reflected from the second MEMS mirror array and be detected by the second optoelectronic microchip via a first optical detector (see, e.g., process block 811), in an embodiment. The second optoelectronic microchip may then communicate a second electronic signal to the second microchip (included in a microchip package with the second optoelectronic microchip) in response to the detection of the first optical signal (see, e.g., process block 813).

The flow of events illustrated in FIG. 8 then enters an iterative loop wherein the second microchip may perform a processing operation (see, e.g., block 801), and if necessary, communicate with another microchip, including responding to the first microchip (see, e.g., block 803), in an embodiment. For example, the second microchip may send a third electronic signal to the second optoelectronic microchip (see, e.g., block 805), and the second optoelectronic microchip may generate a second optical signal, via a second optical source, in response to the third electronic signal (see, e.g., block 807). The second optical signal may then be transmitted through free-space (see, e.g., block 809) in a manner similar to that described above, and be detected by the first optoelectronic microchip via a second optical detector (see, e.g., block 811). The first optoelectronic microchip may then communicate a fourth electronic signal to the first microchip in response to the detection of the second optical signal (see, e.g., block 813), in an embodiment.

It will be appreciated that this scenario may continue to repeat itself among different ones of a plurality of microchips present in a multichip module or multichip computing environment in accordance with the teachings of the present invention.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A system, comprising:
   a first microchip package mounted to a substrate, the first microchip package including a first microchip electrically coupled to a surface of a first carrier, and a first optoelectronic microchip electrically coupled to the surface of the first carrier; and
   at least one second microchip package mounted to the substrate, the at least one second microchip package including a second microchip electrically coupled to a surface of a second carrier, and a second optoelectronic microchip electrically coupled to the surface of the second carrier,
   the substrate including first and second micro-electro mechanical system (MEMS) mirror arrays optically coupled to the first and second optoelectronic microchips, respectively, the first and second MEMS mirror arrays positioned to reflect optical signals to enable signal communication between the first and second optoelectronic microchips via free-space.

2. The system of claim 1, wherein the first microchip and the first optoelectronic microchip are electrically coupled to opposing sides of the surface of the first carrier.

3. The system of claim 2, wherein the second microchip and the second optoelectronic microchip are electrically coupled to opposing sides of the surface of the second carrier.

4. The system of claim 1, wherein the first optoelectronic microchip includes a first optical source configured to generate a first optical signal in response to a first electronic signal communicated from the first microchip to the first optoelectronic microchip, and
   wherein the second optoelectronic microchip includes a first optical detector configured to detect the first optical signal, and to communicate a second electronic signal to the second microchip in response to detection of the first optical signal.

5. The system of claim 4, wherein the second optoelectronic microchip further includes a second optical source configured to generate a second optical signal in response to a third electronic signal communicated from the second microchip to the second optoelectronic microchip, and
   wherein the first optoelectronic microchip further includes a second optical detector configured to detect the second optical signal, and to communicate a fourth electronic signal to the first microchip in response to detection of the second optical signal.

6. The system of claim 1, wherein the first microchip package further includes at least one additional optoelectronic microchip electrically coupled to the surface of the first carrier, and
   wherein the substrate further includes at least one additional MEMS mirror array optically coupled to the at least one additional optoelectronic microchip, the at least one additional MEMS mirror array positioned to reflect optical signals to and from the at least one additional optoelectronic microchip.

7. The system of claim 6, wherein the at least one additional optoelectronic microchip comprises three optoelectronic microchips electrically coupled to a common side of the surface of the first carrier with the first optoelectronic microchip, and
   wherein the at least one additional MEMS mirror array comprises three MEMS mirror arrays, each one of the three MEMS mirror arrays optically coupled to one of the three optoelectronic microchips.

8. The system of claim 6, wherein the at least one additional optoelectronic microchip comprises seven optoelectronic microchips electrically coupled to a common side of the surface of the first carrier with the first optoelectronic microchip, and
   wherein the at least one additional MEMS mirror array comprises seven MEMS mirror arrays, each one of the seven MEMS mirror arrays optically coupled to one of the seven optoelectronic microchips.

9. The system of claim 1, further comprising an elongated enclosure mounted to the substrate between the first microchip package and the at least one second microchip package.

10. (Currently amended) A method, comprising:
    communicating a first electronic signal from a first microchip to a first optoelectronic microchip, the first optoelectronic microchip electrically coupled to a surface of a first carrier and optically coupled to a first MEMS mirror array of a substrate, the first carrier mounted to the substrate;
    generating a first optical signal in response to the first electronic signal in a direction to cause the first optical signal to reflect from the first MEMS mirror array and from a second MEMS mirror array sequentially, the substrate including the second MEMS mirror array;
    detecting the first optical signal at a second optoelectronic microchip, the second optoelectronic microchip electrically coupled to a surface of a second carrier and optically coupled to the second MEMS mirror array, the second carrier mounted to the substrate; and
    communicating a second electronic signal from the second optoelectronic microchip to a second microchip in response to detection of the first optical signal.

11. The method of claim 10, further comprising:
    communicating a third electronic signal from the second microchip to the second optoelectronic microchip;
    generating a second optical signal in response to the third electronic signal in a direction to cause the second optical signal to be reflected from the second MEMS mirror array and from the first MEMS mirror array sequentially;
    detecting the second optical signal at the first optoelectronic microchip; and
    communicating a fourth electronic signal from the first optoelectronic microchip to the first microchip in response to detection of the second optical signal.

12. The method of claim 10, wherein generating the first optical signal includes applying the first electronic signal to an optical source configured to transmit optical signals.

13. The method of claim 10, wherein detecting the first optical signal includes receiving the first optical signal at an optical detector and generating the second electronic signal in response to the first optical signal.

14. A package, comprising:
    a microchip electrically coupled to a surface of a carrier; and
    at least one optoelectronic microchip including at least one optical element, the at least one optoelectronic microchip electrically coupled to the surface of the carrier in a position to enable transmission of a free-space optical signal between the at least one optical element of the at least one optoelectronic microchip and at least one MEMS mirror array, the at least one MEMS mirror array optically coupled to the at least one optoelectronic microchip, the carrier mountable to a substrate which includes the at least one MEMS mirror array.

15. The package of claim 14, wherein the at least one optoelectronic microchip comprises a single optoelectronic microchip, and wherein the at least one optical element comprises an optical source configured to generate the free-space optical signal.

16. The package of claim 15, wherein the at least one optical element further comprises an optical detector configured to detect the free-space optical signal.

17. The package of claim 14, wherein the at least one optoelectronic microchip comprises a plurality of optoelectronic microchips, the at least one optical element comprises an optical source configured to generate the free-space optical signal and an optical detector configured to detect the free-space optical signal, and wherein the at least one MEMS mirror array comprises a plurality of MEMS mirror arrays, each one of the plurality of MEMS mirror arrays optically coupled to one of the plurality of optoelectronic microchips to reflect the free-space optical signal to or from the one of the plurality of optoelectronic microchips, respectively.

18. The package of claim 17, wherein the plurality of optoelectronic microchips comprises four optoelectronic microchips, and wherein the plurality of MEMS mirror arrays comprises four MEMS mirror arrays.

19. The package of claim 17, wherein the plurality of optoelectronic microchips comprises eight optoelectronic microchips, and wherein the plurality of MEMS mirror arrays comprises eight MEMS mirror arrays.

* * * * *